3,323,900
PROCESS FOR TREATMENT OF IRON OXIDE ORES CONTAINING NICKEL, CHROMIUM AND COBALT

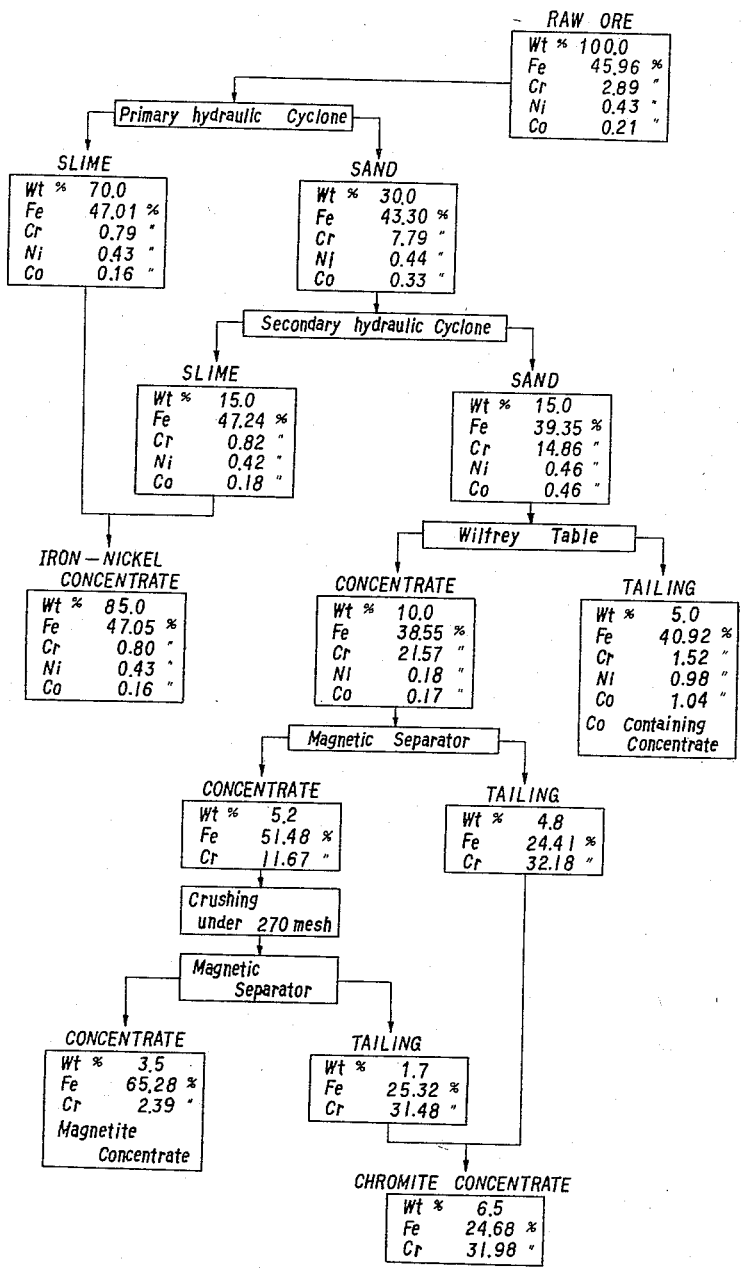

Yoshikazu Takahashi, Machida-shi, Tokyo, Koujiro Kojima, Tokyo, and Hisashi Kahata, Sagamihara-shi, Kanagawa-ken, Japan, assignors to Fuji Iron & Steel Co., Ltd., Tokyo, Japan
Filed Oct. 14, 1964, Ser. No. 403,894
Claims priority, application Japan, Aug. 13, 1964, 39/46,633
6 Claims. (Cl. 75—2)

The present invention relates to a process for treatment of iron oxide ores containing nickel, chromium and cobalt, which ores are commonly called "laterite."

Generally, when an iron oxide ore such as limonite which contains small amounts of nickel, chromium and cobalt oxides is used as iron making material in a blast furnace, almost all of the nickel and chromium oxides are reduced to metallic nickel and chromium which is present in pig iron. During steel making process, the nickel remains in steel and has injurious effects on the properties of the product, while the chrome, though it is removed to a considerable extent, gives rise to difficulties in the processes due to the poor fluidity of slag having a high chrome content.

Such a type of iron ore as mentioned above is found, however, in abundance not only in Japan but also in many places in the world such as the Philippines, Indonesia, New Caledonia, Central America and South America. The estimated amount of their deposits is said to be almost inexhaustible, and these iron ores have long been the object of attention in Japan where the great portion of iron ores has been obliged to be imported from abroad. Thus, as to the utilization of laterite as iron ore by removing therefrom nickel, chromium and etc., there have been carried out many studies in various aspects, but all of such studies had technical or economical difficulties.

Also as to the utilization of the chrome separated from laterite ores, in spite of various investigations conducted with this purpose, no satisfying result has been obtained as yet.

On the other hand, the chromium in iron oxide ores containing nickel, chrome and cobalt is mainly in the form of coarse granules of chromite and it has been known that when soft limonite ores are crushed under avoidance of crushing the chromite portion into too fine powder and subjected to classification, the chromium can be separated and concentrated in a sand fraction. For example, it is known that when a laterite is brought into a state of slurry by adding water and subjected to fractional sedimentation in water, results as shown in Table 1 are obtained.

TABLE 1.—RESULT OF FRACTIONAL SEDIMENTATION FOR THE CHROMIUM REMOVAL

| Sedimentation velocity | Weight percent | Fe (percent) | Cr (percent) | SiO$_2$ (percent) |
|---|---|---|---|---|
| Fine particles, <0.1 mm./sec | 20 | 46.67 | 0.64 | 11.95 |
| Small granules, 0.1-2 mm./sec | 45 | 48.18 | 0.81 | 11.31 |
| Medial granules, >2 mm./sec | 35 | 42.43 | 6.21 | 22.50 |
| Original sample | 100 | 45.30 | 2.67 | 15.40 |

According to another example of experiment a laterite ore is added with water into slurry, which is subjected to classification by means of a hydraulic cyclone, and the result as shown in Table 2 has been reported.

TABLE 2.—RESULT OF HYDRAULIC CYCLONE TREATMENT FOR THE REMOVAL OF CHROMIUM

| Pressure of feed | Products | | Size distribution of products (percent) | | |
|---|---|---|---|---|---|
| | Wt percent | Cr percent | +200 Mesh | 200-400 Mesh | −400 Mesh |
| Overflow | 93.6 | 1.23 | 3.9 | 12.6 | 83.5 |
| 0.5 atm.: Underflow | 6.4 | 11.94 | 87.9 | 8.6 | 3.5 |
| Overflow | 87.5 | 1.12 | 0.8 | 5.4 | 93.8 |
| 3.0 atm.: Underflow | 12.5 | 12.29 | 56.6 | 37.6 | 5.8 |

As seen in the experimental results shown in Tables 1 and 2, the chromium content which is concentrated into the coarse portions is as low as only 6.21%–12.29%, which values are too low for utilizing such coarse portion as raw material for producing ferrochrome for chromium steel. Raw material for this purpose must have more than 30% of chrome for that purpose.

The segregation of cobalt is also obtained by a classification, but its concentration is not so good.

The object of the present invention is therefore to provide a procedure for recovering valuable metal elements such as nickel, chromium, cobalt and iron in the form of high grade concentrates suitable to be industrially utilized from iron oxide ores containing nickel, chromium and cobalt.

It has been found, during the treatment of laterites, that the chromite which contains most of the all chromium content, and the iron oxide in the form of magnetite are segregated into comparatively coarse fractions. Furthermore, chromite is non-magnetic, while magnetite is strongly magnetic.

It is therefore possible to provide a suitable process for the treatment of laterites based on these fundamental observations and facts by combining the processes of classification, gravity concentration and magnetic separation with one another.

The ore is separated by means of a single multiple staged classifying means such as, for instance, a hydraulic cyclone into fine particles of nickel containing iron oxide ore low in chromium and cobalt contents and a sand ore rich in chromium and cobalt contents, and the thus obtained sand is treated by the technique of gravity concentration, for instance, with a table or a spiral concentrator into a chromium concentrate and a cobalt concentrate, and further this chromium concentrate, after being partially crushed into fine particles, if necessary, is subjected to magnetic separation into a chromite concentrate and a magnetic concentrate, whereby one or more of the nickel containing iron oxide ore, the chromium containing iron ore, the cobalt-containing concentrate and the magnetite concentrate is obtained.

Most of the nickel and the iron oxide segregate in the form of fine particles, though these particles still contain a small amount of the chromium and cobalt. As nickel and cobalt are more susceptible to reduction than iron (the great portion of which exists in the form of dimonite or earthy hematite) as well as than chromium, the nickel and cobalt contents can be easily precipitated in the metallic form by a reducing roasting treatment as described later, when the iron content is reduced to magnetite, while the chromium content is not substantially affected and remains in the roasted ore. Accordingly as the tailing after removal of nickel and cobalt through the concentration process also mentioned hereinafter contains the great portion of the iron content and a small portion of the chromium content together with gangue, it is possible to put this tailing to use as raw material for iron manufacture not only directly but also after increasing the iron content and lowering the chromium content by magnetic separation.

Now the processes of reducing roasting and concentration referred to above will be explained in the following.

The reducing roasting means the following process:

The raw ore is dried or calcined at a temperature above 100° C. and mixed with a halide and a solid reducing agent in powder form, such as coke coal or charcoal powder, and subjected to a roasting treatment to cause most of the metallic nickel to precipitate.

The concentration means the following four treatments:

(1) The roaster ore is directly or after being crushed, mixed with water, a salt of a metal less electropositive than nickel, such as, for instance, copper sulfate or a salt of silver or mercury is added to cause the surface of the metallic nickel powder to be coated by these metals, and the thus treated ore is then subjected to flotation so as to recover the nickel concentrate.

(2) A treatment for recovering the nickel powder from the roasted ore by magnetic separation.

(3) A treatment for recovering the nickel from the nickel concentrate and the tailing separated through the treatment (1) by subjecting them further to a magnetic separation.

(4) A treatment comprising adding a salt of a metal less electropositive than nickel to the nickel concentrate recovered according to the treatment (2), to cause the surface of the metallic nickel to be coated by said metal and subjecting the thus treated nickel concentrate to an ordinary flotation to raise the nickel grade.

In this way, it is possible to obtain two and more products of a nickel concentrate, a cobalt containing concentrate, a chromium containing concentrate and a magnetite concentrate.

In the practice of the aforesaid methods, however, the dehydration and drying operations require much labour and cost when the raw ore is directly subjected to the wet treatments, because most of the iron oxide ore containing nickel chromium and cobalt (so called laterite) is in a state of earth or clay. In such a case, therefore, it is advantageous that laterite is dried or calcined and then ground to about 65 mesh.

The powder ore is then subjected to the reducing, roasting, and flotation processes to recover nickel concentrate, and the tailing is subjected to magnetic separation to obtain magnetite, and further the tailing obtained from the magnetic separation is classified and the sand (more than about 36$\mu$) is subjected to gravity concentration to yield chromium concentrate. From another sand obtained by classification carried out before magnetic separation, chromium concentrate and magnetite concentrate are obtained by gravity concentration and magnetic separation.

It is therefore possible to obtain advantageously two or more of the products comprising nickel concentrate, magnetite concentrate and chromium concentrate.

In the case of the conventional method of treating iron oxide ores containing nickel, chromium and cobalt, the effect of which method has been already described, the chromium has tendency to be concentrated in the sand fraction, but the chromium content in the sand portion is very low as seen in Tables 1 and 2. Therefore, in view of the general concept that more than about 30 percent of chromium content is required in a material for ferrochromium for special steels, such iron ore can not be utilized for such purpose by the conventional process.

In the case of the present invention, on the contrary, the chromite concentrate obtained after the first and second magnetic separation processes has a chromium content higher than about 31% and can be used with ease as a chromium ore.

Also as to the cobalt containing concentrate, a concentrate obtained by treating with Wilfrey table proves to have a high content of cobalt and is ready to be used as a cobalt ore.

As described hereinbefore and also shown in the embodiment examples presented hereinafter, it is possible according to the present invention to obtain advantageously chromium containing iron ore of high chromium content, which was hitherto impossible to be obtained by the conventional method, cobalt containing concentrate, magnetite concentrate, nickel containing iron oxide ore of low chromium and cobalt contents or high grade nickel concentrate.

Further according to the present invention, it is possible not only to carry out with effect smelting of iron oxide ores containing nickel, chromium and cobalt, but also to obtain chromium concentrate and cobalt concentrate in the form able to be readily utilized as minerals of chromium and cobalt. The present invention will be described in more detail.

It is known that the chromium in iron oxide ores containing nickel, chromium and cobalt exists mainly in the form of coarse granules of chromite, and the present invention is based on an experimental results of the fact described below:

PROPERTIES OF CHROMITES

Studies were done as to the chemical composition the lattice constant and the microhardness on samples containing low amounts of magnetite taken from the laterite ores of Omonhon, Wakasa and Miyakawa (Japan).

(1) *Chemical composition.*—The chemical composition of chromite is shown in Table 3, from which it is seen that this mineral is high in MgO and $Al_2O_3$ and is of such a composition as represented by $(Fe, Mg)O \cdot (Fe, Cr, Al)_2O_3$.

TABLE 3.—CHEMICAL COMPOSITION OF CHROMITE

| Origin Total | Fe (Percent) | Cr (Percent) | MgO (Percent) | $Al_2O_3$ (Percent) |
| --- | --- | --- | --- | --- |
| Omanhon | 23.13 | 31.73 | 9.89 | 8.48 |
| Wakasa | 15.71 | 34.62 | 11.74 | 12.93 |
| Miyakawa | 22.31 | 33.09 | 10.20 | 9.10 |

(2) *Lattice constant.*—Each of the above three chromites were subjected to X-ray diffraction with chromium target to determine their lattice constants. In Table 4, there are shown the values of lattice constant thus determined, together with those appearing in a literature (W. S. Treffner: "Behavior of Chromite Spinel as Related to Microstructure," J.A.M. Cer. Soc., vol. 44, No. 12, p. 583 (1961)) for several other types of chromite, and for magnetite. The chromite from Omonhon and that from Miyakawa are similar to each other in chemical composition as seen from Table 3 and in the value of lattice constant, as seen from Table 4.

TABLE 4.—LATTICE CONSTANT OF VARIOUS TYPES OF CHROMITE

Origin: Lattice constant (A.)[1]
  Omonhon _____ 8.274
  Wakasa _____ 8.285
  Miyakawa _____ 8.273
  Philippines _____ 8.21
  Cuba _____ 8.21

| Origin: | Lattice constant (A.)[1] |
|---|---|
| Greece | 8.24 |
| Rhodesia | 8.26 |
| Turkey | 8.28 |
| Transvaal | 8.30 |

[1] Lattice constant of magnetite=8.40 A.

(3) *Microhardness.*—Any of chromite, magnetite, hematite and limonite appears gray under a reflecting microscope. While hematite and limonite can be distinguished from each other through their light polarizing property, magnetite and chromite must be distinguished by other means of discrimination because they both belong to cubic system crystals and therefore show no polarization. Therefore, as an aid to the discrimination between these minerals, their microhardness was measured by means of a micro-Vickers hardness tester, and the results obtained are shown in Table 5.

As seen in the table, the hardness of chromite seems to be higher than that of any other minerals referred to; the former is in the range of 1,000–1,200 while the latter is in the range of 500–700. This difference may be useful for discriminating chromite from the others.

Further, the fact that no distinctive relationship is found between magnetic property and microhardness of chromite is suggestive that magnetite is not specially liable to form a solid solution in chromite.

TABLE 5.—RESULTS OF MICROHARDNESS MEASUREMENTS

| Chromites in Laterites | Microhardness | | |
|---|---|---|---|
| | Max. | Min. | Average |
| Homanhon: | | | |
| 1.00% magnetite content | 1,256 | 953 | 1,109 |
| 0.325% | 1,187 | 907 | 1,077 |
| Wakasa: | | | |
| 1.19% | 1,197 | 1,003 | 1,114 |
| 0.27% | 1,272 | 981 | 1,140 |
| 1.37% | [1] 1,427 | 1,018 | 1,188 |
| Miyakawa: | | | |
| 0.57% | 1,257 | 917 | 1,090 |
| 0.34% | 1,097 | 920 | 1,014 |

| Concentrates by magnetic separation of table concentrates | Microhardness | | |
|---|---|---|---|
| | Max. | Min. | Average |
| Homanhon | 882 | 368 | 623 |
| Wakasa | 894 | 387 | 610 |
| Miyakawa | 852 | 592 | 699 |
| Magnetites: | | | |
| Kamaishi (Japan) magnetite | 599 | 443 | 526 |
| Texada magnetite | 757 | 560 | 653 |
| Philippine magnetite | 760 | 470 | 600 |
| Hokkaido (Japan) magnetite | 588 | 378 | 551 |
| Yasuki (Japan) magnetite | 630 | 468 | 535 |
| Hematites and Limonite: | | | |
| Brazil hematite | 981 | 864 | 908 |
| India hematite | 1,141 | 853 | 997 |
| Coa hematite | 556 | 504 | 427 |
| Roberiver limonite | 743 | 589 | 658 |

[1] Concentrates of isodynamic separation.

Based on these facts, the chemical composition of size fractions of laterites classified by sedimentation were investigated, and results are shown in Table 6.

TABLE 6.—CHEMICAL COMPOSITION OF SIZE FRACTIONS OF LATERITES CLASSIFIED BY SEDIMENTATION

| Laterites | Size distribution | Wt. percent | Chemical composition | | |
|---|---|---|---|---|---|
| | | | Percent Fe | Percent Cr | Percent Al$_2$O$_3$ |
| Wakasa (Japan) laterite | ([1]) | 100.0 | 43.98 | 3.32 | 9.83 |
| | +36 | 13.2 | 42.57 | 12.42 | 4.53 |
| | 36/18 | 6.5 | 57.39 | 1.16 | 4.03 |
| | 18/9 | 3.8 | 50.80 | 0.79 | 6.07 |
| | −9 | 77.4 | 43.04 | 0.50 | 10.76 |
| Surigao (Philippines) laterite | ([1]) | 100.00 | 51.62 | 3.18 | 3.33 |
| | +36 | 34.9 | 50.57 | 5.75 | 4.78 |
| | 36/18 | 7.6 | 57.34 | 1.58 | 1.94 |
| | 18/9 | 3.0 | 50.80 | 1.97 | 2.55 |
| | −9 | 54.5 | 51.27 | 1.12 | 3.87 |

[1] Feed ore.

The size diameter was determined by application of Stoke's equation in which the specific gravity of a sand was taken at a predetermined value of 4.0.

As seen from Table 6, chromium is concentrated in the coarsest particles, this being particularly eminent in the case of Wakasa laterite, and the chromium content in the −9μ fraction is as low as 0.5%. The concentration is not so conspicuous with the surigao laterite, and this is in agreement with the known data for laterites produced in southern countries.

The difference is possibly attributable to either a singularity of Wakasa chromite or the moderateness of the weathering condition to which the ore had been exposed.

Table 7 shows the yield by weight of the concentrates after chromium removal, the chromium content and rate of chromium removal in the case of classification above 36μ.

TABLE 7.—CONCENTRATES AFTER CHROMIUM REMOVAL CLASSIFIED BY TAKING 36μ AS STANDARD

| | Yield by weight (percent) | Cr content (percent) | Rate of Cr removal (percent) |
|---|---|---|---|
| Wakasa laterite | 87.7 | 0.56 | 74.7 |
| Surigao laterite | 65.1 | 1.24 | 78.6 |

From the above results it was found that a high rate of chromium removal is attained in classification of laterite when 36μ is adapted as classification standard.

Further, the inventors classified the Homanhon laterites at 36μ by hydraulic cyclone and obtained the underflows and overflows. Then the underflow (first underflow) was further classified (second classification) at 36μ using a hydraulic cyclone.

As a result, the second overflow (41.8 wt. percent) containing 0.91% of chromium and the second underflow (58.2 wt. percent) containing 10.01% of chromium were obtained. Attempts were then made to separate the portion with a size lower than 36μ by using a hydraulic cyclone, and it was discovered that by such separation the yield by weight of the overflow can be further raised without increasing its chromium content, and the chromium content in the underflow can be also increased. It was therefore to be advantageous to subject the first underflow to further cyclone treatment.

In addition, it was also found that, when it is desired to increase further the chromium content in the second underflow containing 8–11 percent of chromium, together with a considerable amount of gangue particles, it is possible to concentrate the chromium content up to about 26% in the case of Homonhon laterite by employing the technique of gravity concentration, for example by using a Wilfley table.

However, for further concentration of the chromium beyond this point of about 26%, it was found that gravity concentration alone is not sufficient because the chromium-containing-concentrate contains magnetite, part of which forms a eutectic with the chromite. To achieve the desired result, it was in fact found that the chromium content can be concentrated further up to about 32% by magnetic separation in addition to the gravity concentration.

The present invention, being based upon the above-explained disclosures, is characterized in that an iron oxide ore containing nickel, chromium and cobalt is separated by means of a classifier into an iron oxide ore low in chromium and cobalt and a sand containing chromium and cobalt, said sand is separated by the gravity concentration into a chromium containing concentrate and cobalt containing concentrate and further said chromium containing concentrate is separated, either directly or after partially pulverizing, by magnetic separation into a chromite concentrate and a magnetite concentrate to obtain one or more than two members of the products comprising a nickel containing iron oxide ore low in chromium and cobalt contents, a chromium containing iron ore, a cobalt containing concentrate and a magnetite concentrate, thus using iron oxide ores containing nickel, chromium and cobalt as raw material for iron manufacture utilizing advantageously valuable components in the ores.

In the following there will be given an example of embodiment of the present invention.

The appended drawing is a schematic flow sheet of the process of the present invention.

*Example*

A. *Chromium removal by hydraulic cyclone treatment.*—Samples of Wakasa laterite containing 46.46% Fe, 2.89% Cr, 0.48% Ni and 0.34% Co and Omonhon laterite containing 43.85% Fe, 4.15% Cr, 0.84% Ni and 0.21% Co were classified by means of a primary hydraulic cyclone and a secondary one, the results of which are shown in Tables 8 and 9.

TABLE 8.—TREATMENT OF WAKASA LATERITE WITH HYDRAULIC CYCLONES

|  | Classification by primary hydraulic cyclone | | Classification by secondary hydraulic cyclone | |
| --- | --- | --- | --- | --- |
|  | Overflow | Underflow | Overflow | Underflow |
| Wt percent | 70.0 | 30.0 | 15.0 | 15.0 |
| Chemical composition: | | | | |
| Percent Fe | 47.01 | 45.20 | 47.24 | 41.25 |
| Percent Cr | 0.79 | 7.79 | 0.87 | 10.26 |
| Percent Ni | 0.43 | 0.61 | 0.42 | 0.56 |
| Percent Co | 0.19 | 0.70 | 0.18 | 0.41 |
| Rate of Cr Removal (percent) | 81.0 | | 69.5 | |

TABLE 9.—TREATMENT OF HOMONHON LATERITE WITH HYDRAULIC CYCLONES

|  | Classification by primary hydraulic cyclone | | Classification by secondary hydraulic cyclone | |
| --- | --- | --- | --- | --- |
|  | Overflow | Underflow | Overflow | Underflow |
| Wt. percent | 65.8 | 34.2 | 20.0 | 14.2 |
| Chemical composition: | | | | |
| Percent Fe | 49.66 | 34.79 | 47.97 | 30.55 |
| Percent Cr | 1.07 | 10.09 | 1.21 | 11.72 |
| Percent Ni | 0.99 | 0.56 | 1.01 | 0.44 |
| Percent Co | 0.18 | 0.26 | 0.16 | 0.28 |
| Rate of Cr removal (percent) | 83.1 | | 64.0 | |

From the primary overflow and the secondary overflow, a chromium-removed concentrate amounting to 85.0% by weight and containing 47.05% Fe, 0.80% Cr, 0.43% Ni and 0.19% Co was obtained in the case of Wakasa laterite, and one amounting to 85.8% by weight and containing 49.25% Fe, 1.10% Cr, 0.99% Ni and 0.17% Co was obtained in the case of Homonhon laterite.

B. *Chromium concentration of secondary underflow.*—The secondary underflow obtained by the hydraulic cyclone in A was concentrated by means of a Wiffrey table, results of which are shown in Tables 10 and 11. The Wilfrey table employed was of 1,200 x 600 mm. size and of 320 strokes per minute.

TABLE 10.—RESULT OF TABLE-SEPARATION OF WAKASA LATERITE UNDERFLOW

|  | Weight percent | Chemical composition, total | | | | | | | |
| --- | --- | --- | --- | --- | --- | --- | --- | --- | --- |
|  |  | Fe | Cr | Al₂O₃ | SiO₂ | MgO | Ni | Co | TiO₂ |
| Concentrate | 58.0 | 35.55 | 21.57 | 8.95 | 1.18 |  | 0.16 | 0.17 | 0.09 |
| Middling | 12.6 |  | 7.74 |  |  |  |  |  |  |
| Tailing | 29.4 | 40.92 | 1.52 | 8.66 | 7.10 | 1.18 | 0.97 | 1.04 | 0.16 |

TABLE 11.—RESULT OF TABLE-CONCENTRATION OF OMONHON LATERITE UNDERFLOW

|  | Weight percent | Chemical composition, total | | | | | | | |
| --- | --- | --- | --- | --- | --- | --- | --- | --- | --- |
|  |  | Fe | Cr | Al₂O₃ | SiO₂ | MgO | Ni | Co | TiO₂ |
| Concentrate | 63.4 | 31.83 | 25.83 | 7.37 | 1.06 |  | 0.13 | 0.57 | 0.24 |
| Middling | 13.3 |  | 2.10 |  |  |  |  |  |  |
| Tailing | 23.3 | 18.81 | 0.60 | 36.34 | 4.52 | 0.96 | 0.48 | 0.36 | 0.52 |

The cobalt containing concentrate obtained as tailing is subjected to further treatment for recovering Co, Ni and etc. and can be utilized as iron manufacture raw material.

C. *Magnetic separation of table-concentrate.*—In order to raise the chromium content of the table-concentrates obtained in B, the concentrates were subjected to separation by a Davis type magnetic separation testing machine, the results of which are shown in Table 12.

TABLE 12.—RESULT OF SEPARATION OF TABLE-CONCENTRATE BY DAVIS TYPE MAGNETIC SEPARATION TESTING MACHINE

|  | Weight percent | Chemical composition | | |
| --- | --- | --- | --- | --- |
|  |  | Fe | Cr | TiO$_2$ |
| Wakasa: |  |  |  |  |
| Concentrate | 51.6 | 51.48 | 11.67 | 0.13 |
| Tailing | 48.6 | 24.41 | 32.18 | 0.12 |
| Starting ore | 100.0 | 35.55 | 21.57 | 0.09 |
| Omonhon: |  |  |  |  |
| Concentrate | 29.8 | 51.37 | 13.57 | 0.24 |
| Tailing | 70.2 | 25.10 | 31.70 | 0.21 |
| Starting ore | 100.0 | 31.83 | 25.83 | 0.24 |

Ore sample supplied to Davis type magnetic separation testing machine.

As obvious from the above results, a chromite concentrate is obtained as a tailing with a chromium content of above 30% by magnetic concentration of table-concentrate. The chromite concentrate thus obtained can be utilized advantageously as a raw material for producing ferrochrome.

D. Since the concentrate obtained by magnetic separation in C contains magnetite, a part of which co-exists with chromite, chromite removal was carried out to raise the actual yield of chromium by grinding the magnetic concentrate separated in the course of the first magnetic separation and subjecting the ground material to the secondary magnetic separation. The results obtained are shown in Table 13.

TABLE 13.—RESULT OF FINELY GRINDING FOLLOWED BY MAGNETIC SEPARATION OF THE MAGNETIC CONCENTRATE SEPARATED FROM TABLE CONCENTRATE BY SALA DRUM TYPE MAGNETIC SEPARATION MACHINE

|  | Concentrate | | Tailing | |
| --- | --- | --- | --- | --- |
|  | Wt. (percent) | Cr (percent) | Wt. (percent) | Cr (percent) |
| Wakasa: |  |  |  |  |
| 200–270 mesh | 78.6 | 6.38 | 21.4 | 33.06 |
| 270–400 mesh | 76.5 | 5.82 | 23.4 | 32.66 |
| Finer than 400 mesh | 84.5 | 4.39 | 15.5 | 29.84 |
| Omonhon: |  |  |  |  |
| 200–270 mesh | 84.8 | 9.50 | 15.2 | 28.63 |
| 270–400 mesh | 81.7 | 8.36 | 18.3 | 25.71 |
| Finer than 400 mesh | 79.0 |  | 21.0 | 26.03 |

In this way a magnetite concentrate is obtained as concentrate and a chromite concentrate is obtained as tailing, the latter, together with the tailing obtained by magnetic separation in C, being able to be utilized advantageously as material for producing ferrochrome, for example.

E. *Recovery of iron concentrate from cyclone overflow.*—The mixture of the first and the second overflows, that is, finely divided ores under about 36μ which had been removed of chromium were dewatered and dried and then mixed with 4% of calcium chloride and 3% of coke powder. The mixture thus prepared was roasted for 1 hour at 970° C., then cooled in a current of nitrogen and thereafter suspended in water. The suspension was added under stirring with copper sulfate in an amount of 1.5 kg. per unit ton of the suspension and subjected to flotation to separate and recover the nickel. Then, the tailing was treated with a wet type magnetic separation, and an iron concentrate was recovered. The results obtained are shown in Table 14, below.

As for the increased iron content and the decreased amount of the tailing from which nickel had been removed by flotation, they are due to the removal of the nickel concentrate low in iron content, as well as due to the removal of combined water and the partial reduction of iron oxide during the roasting.

As seen in the table, magnetic separation is fairly effective in raising the grade of iron, but little effective in removing chromium.

Therefore, the flotation tailing may be directly used as material for iron production, though containing about 1% of chromium, or may be used so after magnetic separation when its iron content is low.

What is claimed:
1. A method of separating and recovering values of chromium from iron oxide ores of the laterite type containing oxides of nickel, chromium and cobalt comprising separating said ore into a fine particle phase having a high iron oxide content and a low chromium oxide content and a sand phase having a high chromium oxide content and a low iron oxide content by means of classification, gravity separating said sand phase into a chromium concentrate and a coarse gangue and magnetically separating said chromium concentrate phase into a chromite phase having a sufficiently high percentage of chromium oxide to be utilizable as a chromium ore and a magnetite concentrate.

2. The method of claim 1, wherein said ore is classified by means of passing said iron ore through a hydraulic cyclone classifier.

3. A process for separating and recovering values of nickel from iron oxide ores of the laterite type containing oxides of nickel, chromium and cobalt comprising separating said ores to form a fine particle phase having a high iron oxide and nickel oxide content and a low chromium oxide content and a sand phase having a high chromium oxide content and a low iron oxide and nickel oxide content by means of classification, mixing said fine particle phase with a halide and a powdered reducing agent, roasting said resulting mixture to thereby reduce the nickel

TABLE 14.—RESULT OF RECOVERING MAGNETITE CONCENTRATE

| Source of ore | Treatment | Wt. (percent) | Fe (percent) | Cr (percent) | Ni (percent) | Co (percent) | Remark |
| --- | --- | --- | --- | --- | --- | --- | --- |
| Omonhon | Raw ore | 100 | 43.85 | 4.15 | 0.84 | 0.21 |  |
|  | Classification | 85.8 | 49.25 | 1.10 | 0.99 | 0.17 | Cyclone overflow. |
|  | Flotation | 57.2 | 62.61 | 1.00 | 0.22 | 0.06 | Flotation tailing. |
|  | Magnetic separation | 48.5 | 66.23 | 1.03 |  |  | Magnetically collected concentrate. |
| Wakasa | Raw ore | 100 | 46.46 | 2.89 | 0.48 | 0.34 |  |
|  | Classification | 85.0 | 47.05 | 0.80 | 0.43 | 0.19 |  |
|  | Flotation | 64.2 | 57.26 | 1.02 | 0.09 | 0.10 |  |
|  | Magnetic separation | 45.0 | 59.33 | 0.95 |  |  |  |
| Miyakawa | Raw ore | 100 | 46.29 | 3.48 | 0.79 | 0.33 |  |
|  | Classification | 74.3 | 47.17 | 1.05 | 0.84 | 0.17 |  |
|  | Flotation | 59.3 | 56.68 | 1.21 | 0.36 | 0.04 |  |
|  | Magnetic separation | 41.8 | 58.72 | 1.00 |  |  |  | oxide to metallic nickel powder and separating said metallic nickel powder from the roasted mixture.

4. The process of claim 3, wherein said metallic nickel powder is separated from the roasted ore by first mixing the roasted ore with water and a salt of a metal less electropositive than nickel, allowing said nickel powder to be coated by the less electropositive metal, and thereafter subjecting the mixture to flotation to recover the nickel therefrom.

5. A method of separating and recovering values of chromium and nickel from iron oxide ores of the laterite type containing oxides of nickel, chromium and cobalt comprising mixing said iron ore with a powdered reducing agent, subjecting said mixing to roasting to reduce the nickel oxide to metallic nickel powder, thereafter separating said metallic nickel powder from said roasted ore, separating said roasted ore into a fine particle phase having a high iron oxide content and a low chromium oxide content and a sand phase having a high chromium oxide content and a low iron oxide content by means of classification, gravity separating said sand phase into a chromium concentrate and coarse gangue, and magnetically separating said chromium concentrate into a chromite phase having a sufficiently high percentage of chromium oxide to be utilizable as a chromium ore and a magnetite concentrate.

6. A process of claim 5, wherein said nickel powder is separated from said roasted ore by mixing said roasted ore with water and a salt of a metal less electropositive than nickel thereby causing said nickel powder to be coated by the less electropositive metal and subjecting said mixture to flotation so as to recover the nickel therefrom.

References Cited

UNITED STATES PATENTS

| | | | |
|---|---|---|---|
| 1,575,852 | 3/1926 | McCormack | 75—1 |
| 2,030,868 | 2/1936 | Hart | 75—1 |
| 2,199,654 | 5/1940 | Simpson | 75—1 |
| 2,363,315 | 11/1944 | Grothe | 75—1 |
| 2,843,472 | 7/1958 | Eberhardt | 75—1 |

FOREIGN PATENTS

| | | |
|---|---|---|
| 528,289 | 7/1956 | Canada. |
| 1,142,321 | 1/1963 | Germany. |

BENJAMIN HENKIN, *Primary Examiner.*

DAVID L. RECK, *Examiner.*